Figure 1:
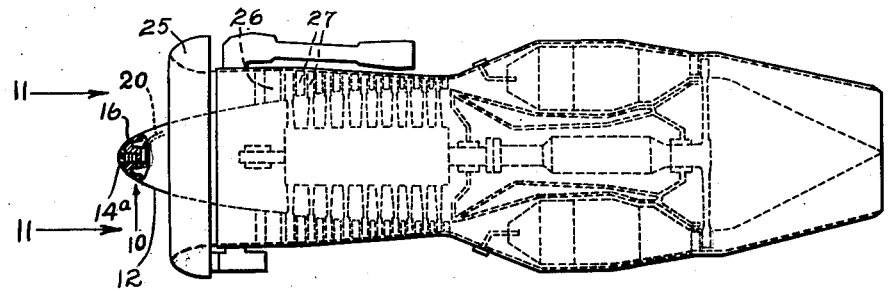

Nov. 12, 1957 R. G. MESCHINO 2,812,899
INTAKE SPRINKLER FOR GAS TURBINE ENGINES
Filed Aug. 10, 1950 2 Sheets-Sheet 1

INVENTOR
R. G. MESCHINO
PER
ATTORNEY.

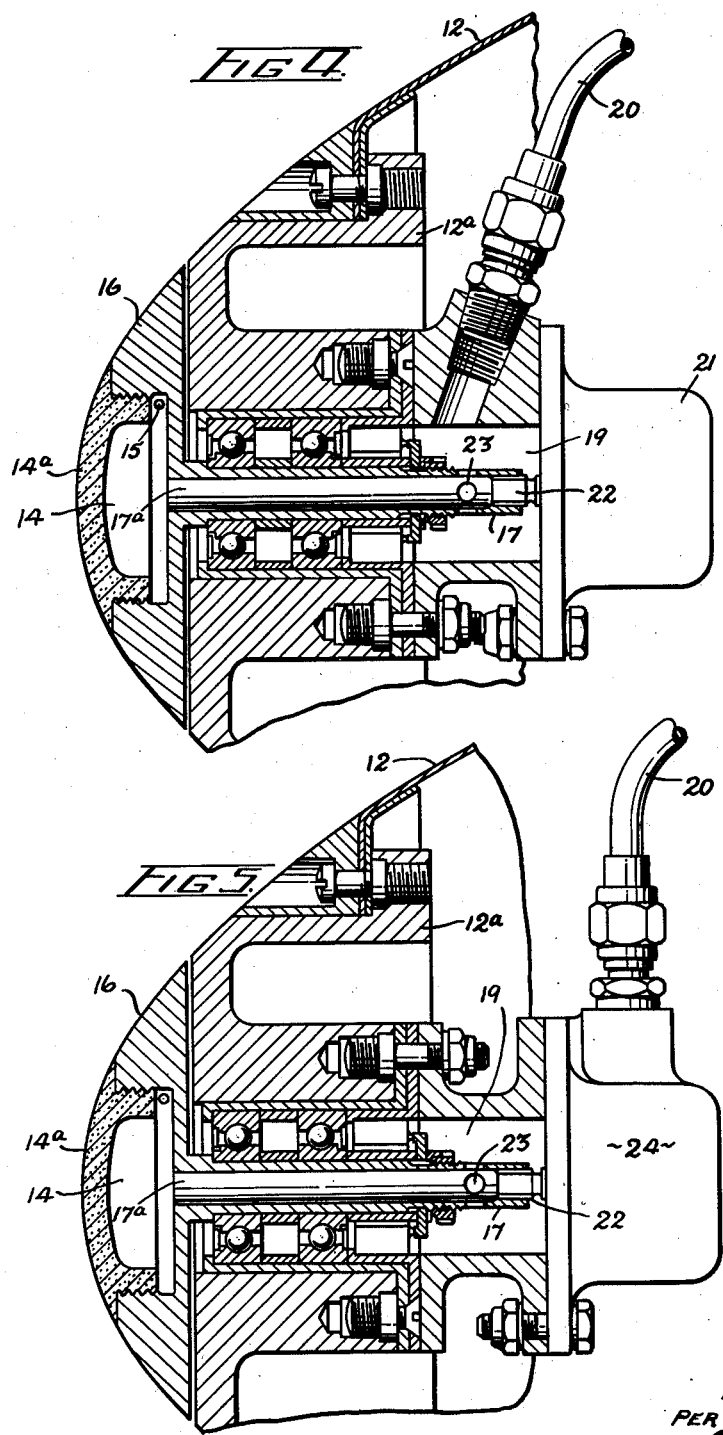

United States Patent Office 2,812,899
Patented Nov. 12, 1957

2,812,899
INTAKE SPRINKLER FOR GAS TURBINE ENGINES

Ronald Guerin Meschino, Toronto, Ontario, Canada, assignor to A. V. Roe Canada Limited, Malton, Ontario, Canada, a corporation Application August 10, 1950, Serial No. 178,602
Claims priority, application Great Britain August 30, 1949

5 Claims. (Cl. 230—132)

This invention relates to methods for producing a spray of liquid in the air intake of a gas turbine engine, more particularly in the intake of such an engine employing an axial flow compressor and designed for use in aircraft.

The introduction of a spray of liquid into the air intake of a gas turbine engine is frequently desirable for such purposes as water injection or the application of an anti-icing fluid to the components of the air intake and to the first few rows of blades in the compressor. Those skilled in the art will be familiar with the benefits to be derived from the introduction of water or, more usually, a water-methanol mixture to the charge entering any internal combustion engine in order to cool the charge and so enable a greater mass of air to be introduced into the cycle. It is also commonly known that the application of alcohol or special anti-icing fluids to those aircraft components subject to icing under adverse atmospheric conditions is an effective method of preventing the ice formation. For both or either of these purposes it is desirable to have a light and simple installation disposed in the air intake of a gas turbine engine for the uniform distribution of the appropriate liquid throughout the air stream.

The air intake of a gas turbine engine is usually of annular form and, in the past, liquid for water injection or anti-icing purposes has been introduced by means of atomizing spray nozzles located at intervals around the wall of the intake and spraying transversely of the air flow into the compressor. It will be readily appreciated that this arrangement suffers from the disadvantage that the liquid can not be uniformly distributed around the annulus of the intake and in addition it has been found that a finely atomized spray does not penetrate the high velocity air stream effectively, the small droplets being carried downstream in a steep trajectory. Furthermore, this system of multiple spray nozzles is itself subject to icing and the piping involved in conducting the liquid to the nozzles is complicated and heavy. Another system which has been proposed is the introduction of a forwardly facing nozzle in the nose of the central fairing of the intake so that a conical spray, coaxial with the intake annulus is injected forwardly into the air stream, so obtaining comparatively uniform circumferential distribution. However this arrangement also suffers from the disadvantage of inadequate radial penetration across the air stream.

The object of this invention is to provide a means of spraying liquid across the area of the intake in such a way that it is uniformly distributed over the area both radially and circumferentially, without obstructing the flow of air through the intake.

This object is achieved by a sprinkler comprising a spinner which fairs smoothly into the contour of one of the fixed walls of the annular air intake of the engine at the forward end thereof adjacent the entry of the intake, forming a continuation of the wall and thus providing a smooth unobstructed passage for the air through the intake, and which has at least one hole in its surface forming an outlet opening into the annular intake, and is supplied with liquid for ejection from the outlet across the air inlet into the air entering the intake and is rotated about a line coincident with the longitudinal axis of the intake.

The invention will be more readily understood from consideration of the following description of a typical application thereof and of two variants embodying alternative means for rotating the outlet. In the accompanying drawings which form a part of the specification and in which like reference characters denote like parts throughout the same, Fig. 1 is a side elevation of a gas turbine engine constructed in accordance with this invention, showing the compressor and other parts of the engine in dotted lines, and having the nose of the fairing partly broken away to show in a general way the location of the sprinkler, Fig. 2 is an enlarged cross-sectional view of the nose of a fairing showing the details of the sprinkler's construction, Fig. 3 is the view taken on section 3—3 in Fig. 2, Fig. 4 is an enlarged cross-sectional view of the nose of a fairing showing details of an alternative construction, embodying an auxiliary electric motor, and Fig. 5 is an enlarged cross-sectional view of the nose of a fairing showing details of an alternative construction, embodying an auxiliary hydraulic motor.

As an example, the sprinkler 10 is shown installed in an axial flow gas turbine engine (Fig. 1). The engine has an annular intake 11 bounded by inner and outer walls, of which the inner wall is formed by the central fairing 12, and the outer wall is formed by the ring 25. Intake 11 carries the flow of air to and through inlet guide vanes 26 and fixed and rotatable compressor blades 27. It is desired to obtain uniform distribution of liquid across the intake before the intake air comes into contact with said guide vanes and blades. To achieve this the intake must be smooth, clear, and unobstructed and the sprinkler 10 must be located at the forward end of the intake upstream and remote from the inlet guide vanes and blades.

Figure 3:
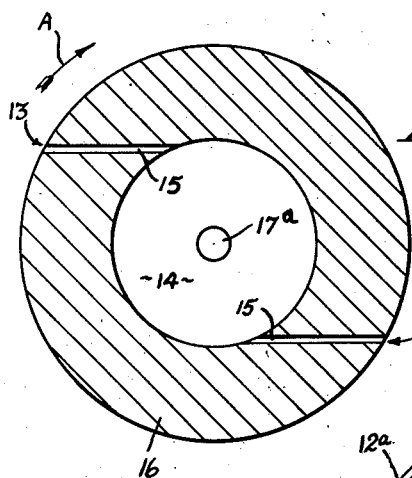
Figure 2:
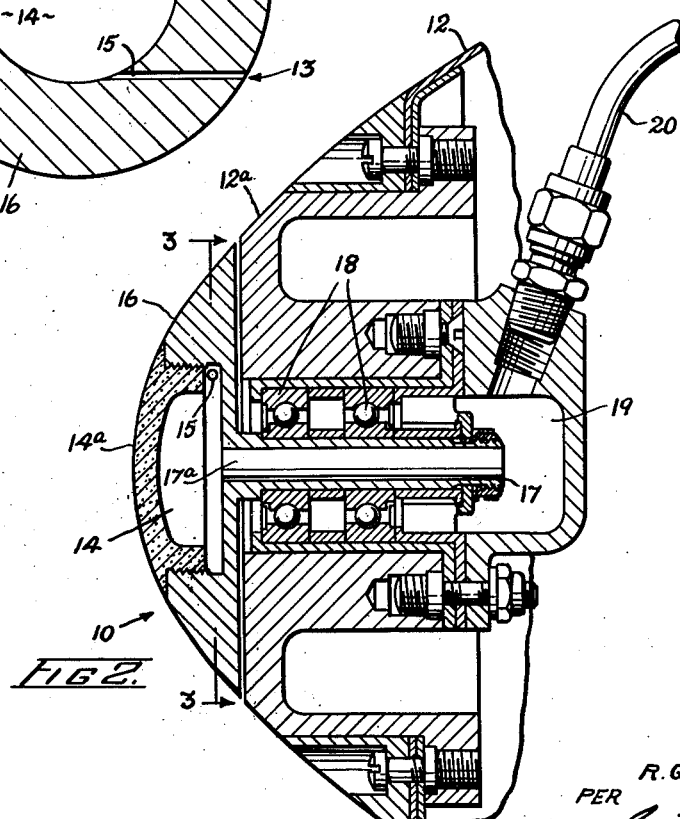

The sprinkler 10 is installed in the forward end or nose of the central fairing and as shown in Figures 2 and 3 embodies two holes 13 in its outer surface forming outlets directed across the intake connected to a central chamber 14 by small diameter tangential passages 15, 15. The chamber 14 is closed by a nut 14a which may conveniently be made of porous metal, for reasons which will be explained later. The head of the sprinkler comprises a mushroom-shaped rotor or spinner 16 mounted centrally upon and rotatable with a hollow shaft 17 which is carried in bearings 18 installed in a housing 12a mounted on the forward end of the central fairing 12. The contours of the forwardly facing surfaces of the spinner 16 and the housing 12a are such that they fair smoothly into one another and into the surface of the central fairing 12 and form part of the inner wall of the intake. The bore of the hollow shaft 17 forms a passage or duct 17a feeding into the chamber 14. Immediately to the rear of the bearings, within the central fairing, is a second chamber 19 fed with liquid by a pipe 20 from a remote source (not shown) and the end of the shaft protrudes into the second chamber so that a continuous passage is provided from the pipe 20 to the outlets 13.

Liquid is supplied under pressure from the source to the pipe 20 and the rear chamber 19; it flows forwardly through the duct 17a in the hollow shaft 17 to the chamber 14 and thence, by way of the passages 15, to the outlet holes 13. In my preferred embodiment, the passages 15, 15 extending substantially at right angles to the axis of rotation of the spinner and in a direction other than radial so that ejection of the liquid from the outlets into the intake 11 takes place laterally, rather than radially to the axis of the spinner 16 (Fig. 3); as a result, the reaction of the ejected liquid on the spinner causes it to rotate as a hydraulic reaction motor, in the direction of the arrow A, and at a speed dependent upon the pressure of the supply of liquid. In this construction the spinner 16 is the rotor of the hydraulic reaction motor and the holes 13 are the exhaust outlets for the motor.

Other means for rotating the spinner may be used. In the embodiment of the invention illustrated in Figure 4 the spinner is rotated by a small electric motor 21 mounted to the rear of the assembly and driving the shaft 17 through splines 22. Liquid entering chamber 19 through pipe 20 enters duct 17a in the hollow shaft 17 through aperture 23. In the embodiment illustrated in Figure 5, a hydraulic motor 24 is similarly mounted and operated by the water-injection liquid or anti-icing liquid entering the motor under pressure from the source of supply through pipe 20 and exhausting into the chamber 19, from which it passes through aperture 23 to the duct 17a in the shaft 17 and is eventually ejected through the spinner into the air intake.

Those skilled in the art will readily appreciate that in order to achieve adequate distribution of a liquid by sprinkling, it has been necessary to depart from the principle of atomization on emergence from a spray nozzle and to inject the liquid into the transverse air stream in the form of relatively large droplets capable of adequate penetration by virtue of their momentum. Some degree of atomization of the droplets will then take place in the air stream itself.

A small portion of the liquid in the chamber 14 passes through the porous closure nut 14*a* and thence flows downstream over the surface of the spinner; this arrangement is beneficial in preventing the accumulation of ice on the extreme nose of the spinner, when the installation is being used for anti-icing purposes.

It will be understood that the requirements of water-injection and the introduction of anti-icing fluid differ and that although in both cases the distribution and degree of penetration of the liquid in the transverse air stream must be uniform, in the case of water-injection a sprinkler will be used which will pass a considerably greater quantity of liquid than is required for anti-icing.

The forms of the invention herewith shown and described are to be taken as examples of the same and that various changes in the shape, size and arrangement of the parts may be resorted to without departing from the scope of the subjoined claims.

What I claim as my invention is:

1. In a gas turbine engine having an annular air intake, formed by a fixed central fairing which constitutes the inner wall of the intake and an outer casing which is spaced from the central fairing and which forms the outer wall of the intake, a spinner which fairs smoothly into the contour of the wall of the central fairing adjacent the entry of the intake at the forward end thereof and rotatable about the longitudinal axis of the fairing, said spinner comprising a head and a shaft journalled in said fairing, a passage extending through said shaft and head and opening into the intake through a hole in the surface of the head, a source of liquid, and a passage from said source of liquid communicating with said passage in th spinner for supplying liquid to said passage for ejection into the intake through said hole.

2. In a gas turbine engine having an annular air intake, formed by a fixed central fairing which constitutes the inner wall of the intake and an outer casing which is spaced from the central fairing and which forms the outer wall of the intake, a spinner which fairs smoothly into the contour of the wall of the central fairing adjacent the entry of the intake at the forward end thereof and rotatable about the longitudinal axis of the fairing, said spinner comprising a head and a shaft journalled in said fairing, a passage extending longitudinally through said shaft and laterally through said head and opening into the intake through a hole in the surface of the head, a source of liquid, and a passage from said source of liquid communicating with said passage in the spinner for supplying liquid to said passage for ejection into the intake through said hole.

3. In a gas turbine engine having an annular air intake formed by a fixed central fairing which constitutes the inner wall of the intake and a fixed outer casing which is spaced from the central fairing and which forms the outer wall of the intake, a sprinkler comprising a spinner which fairs smoothly into the contour of one of the fixed walls of the intake and which has at least one hole in its surface forming an outlet opening into and directed across the forward end of said annular intake, both walls of the annular intake being free of obstruction thus providing a smooth passage for the air through the intake, a source of liquid under pressure, a passage for conveying the liquid to the outlet opening in the spinner for ejection across the air intake, said passage adjacent the outlet being disposed in a direction other than parallel to the axis of rotation of the spinner and in a direction other than radial thus providing means for rotating the spinner by the reaction to the ejection of the liquid from the passage through the outlet into the intake.

4. In a gas turbine engine having fixed and rotary parts an annular air intake formed by a fixed central fairing which constitutes the inner wall of the intake and a fixed outer casing which is spaced from the central fairing and which forms the outer wall of the intake, a sprinkler comprising a spinner which fairs smoothly into the contour of one of the fixed walls of the intake and which has at least one hole in its surface forming an outlet opening into and directed across the forward end of said annular intake, both walls of the annular intake being free of obstruction thus providing a smooth passage for the air through the intake, a source of liquid under pressure, an hydraulic motor mounted on a fixed part of the engine for rotating said spinner, means for supplying liquid from the source to energize the hydraulic motor, and a passage for conducting liquid exhausted from the motor to the outlet in the spinner for ejection from the outlet across the air intake.

5. In a gas turbine engine having an annular air intake formed by a fixed central fairing which constitutes the inner wall of the intake and a fixed outer casing which is spaced from the central fairing and which forms the outer wall of the intake, means for introducing liquid into the air entering said intake comprising a hydraulic reaction motor mounted upon said fairing, the said motor having a rotor which is adapted to rotate substantially co-axially with the intake and which carries an exhaust outlet opening into the said intake, whereby the exhaust from the motor is discharged into the intake as the rotor rotates, a source of liquid under pressure, and a means of supplying liquid from the source to the motor.

References Cited in the file of this patent

UNITED STATES PATENTS

| | | |
|---|---|---|
| 2,075,658 | Ramsbottom | Mar. 30, 1937 |
| 2,156,103 | Austin | Apr. 25, 1939 |
| 2,249,940 | Bulloch | July 22, 1941 |
| 2,278,206 | Marshall | Mar. 31, 1942 |
| 2,278,640 | Berge | Apr. 7, 1942 |
| 2,406,473 | Palmatier | Aug. 27, 1946 |
| 2,469,375 | Flagle | May 10, 1949 |
| 2,499,831 | Palmatier | Mar. 7, 1950 |
| 2,551,697 | Palmatier | May 8, 1951 |
| 2,566,319 | Deacon | Sept. 4, 1951 |

FOREIGN PATENTS

| | | |
|---|---|---|
| 540,013 | Great Britain | Oct. 2, 1941 |
| 634,267 | Great Britain | Mar. 15, 1950 |